United States Patent Office 3,810,967
Patented May 14, 1974

3,810,967
PROCESS FOR RECOVERING COBALT FROM OXO REACTION PRODUCTS
Itaru Takasu, Arai, and Masaru Higuchi, Yoshito Hijioka, and Kyozo Arimoto, Ohimachi, Japan, assignors to Daicel Ltd., Osaka, Japan
No Drawing. Filed Sept. 13, 1971, Ser. No. 180,192
Claims priority, application Japan, Sept. 14, 1970,
45/80,806, 45/80,808
Int. Cl. C01g 51/02
U.S. Cl. 423—139                                    7 Claims

ABSTRACT OF THE DISCLOSURE

A process for recovering cobalt from an oxo reaction product, in which the oxo reaction product is contacted with (a) an iron material selected from the group consisting of iron, oxides, hydroxides and salts of iron or (b) an iron-containing mixture prepared by mixing an aqueous solution of a ferrous salt of a strong acid with an aqueous solution of an alkali metal or alkaline earth metal hydroxide, in which a double decomposition has been caused so as to produce ferrous hydroxide, in the presence of water, carbon monoxide and hydrogen. The cobalt present in said oxo reaction product is converted to a water-soluble iron salt of carbonyl cobaltate which is extracted to the aqueous phase. The aqueous is separated from said oxo reaction product. The soluble iron salt of carbonyl cobaltate in said aqueous phase is decomposed with a mineral acid or organic acid to convert it to cobalt carbonyl.

BACKGROUND OF THE INVENTION

Field of the invention

The present invention relates to a process for recovering cobalt from an oxo reaction product.

Description of the prior art

Reactions in which olefinic unsaturated hydrocarbons are reacted with hydrogen and carbon monoxide to produce oxygen containing compounds, especially aldehydes, are generally well known in the art and are referred to as the hydroformylation or oxo reaction. It has been customary, also, to use the term oxo reaction to include a reaction in which alcohols are directly produced by hydrogenating the aforementioned aldehyde produced in the above reaction. Cobalt is generally used as a catalyst in such oxo reaction. Such cobalt catalyst may be introduced in various forms into the oxo reaction system, but it is assumed that the cobalt introduced into the reaction system will be present therein the state of cobalt carbonyl regardless of its original state and that cobalt carbonyl will act as the catalyst for the oxo reaction. Accordingly, it is desirable to recover the cobalt from the oxo reaction product in the form of cobalt carbonyl that has catalytic ability, for reuse.

If cobalt carbonyl is directly introduced into the reaction system, a number of advantages will be obtained, including the following: the induction period, which will often be encountered when cobalt is introduced in other forms, does not occur; the reaction proceeds smoothly even at relatively low temperatures; control of the reaction can be easily conducted; and the quality of the product is improved.

There are known various processes for recovering cobalt in the form of cobalt carbonyl from the oxo reaction product and reusing it in the oxo reaction, including:

(1) a process which comprises adding oxides, hydroxides or salts of alkali or alkaline earth metal to the oxo reaction product, treating the resulting mixture in water gas under a high pressure at an elevated temperature to extract cobalt as a water-soluble compound, treating the thus obtained extract containing water with a mineral acid to recover cobalt in the form of cobalt hydrocarbonyl and dissolving the recovered cobalt into the starting olefinic compound (Japanese patent publication No. 4731/1965);

(2) A process which comprises treating an oxo reaction liquid product with water under mild conditions to convert the cobalt to water-soluble cobalt carbonyl, treating this extracted liquid containing water with a mineral acid or an organic acid and an organic solvent to decompose the water-soluble cobalt carbonyl and simultaneously extracting and recovering the cobalt to the organic solvent phase (Japanese patent publication No. 29567/1968);

(3) A process which comprises distilling the oxo reaction product in carbon monoxide under a high pressure and reusing the cobalt carbonyl remaining in the heavy end as a catalyst (Khim. i. Technol. Tophin. i. Masel 11 5 1966).

However, these known processes are not sufficiently satisfactory with respect to (a) the recovery yield of cobalt when cobalt carbonyl is separated from the oxo reaction porduct and reused, (b) the variation of recovery yields depending on the quality of the starting materials used, (c) the quality of the final oxo reaction product from which the cobalt catalyst was separated, (d) the quality of the cobalt carbonyl recovered, and (e) simplicity of the process and reproducibility of the operation.

SUMMARY OF THE INVENTION

The present invention provides a process which comprises contacting the oxo reaction product with (a) an iron material selected from the group consisting of iron, oxides, hydroxides and weak acid salts of iron or (b) an iron-containing mixture prepared by mixing an aqueous solution of a ferrous salt of strong acid with an aqueous solution of an alkali metal or alkaline earth metal hydroxide, in which a double decomposition has been caused so as to produce ferrous hydroxide. The contacting is carried out in the presence of water, carbon monoxide and hydrogen, thereby extracting cobalt present in said oxo reaction product to the aqueous phase by converting it to a water soluble iron salt of carbonyl cobaltate. The aqueous phase is separated from said oxo reaction product. The water soluble iron salt of carbonyl cobaltate in said aqueous phase is decomposed with a mineral acid or organic acid to convert it to cobalt carbonyl, which is then recovered and reused in the oxo reaction.

According to the present invention, cobalt can be easily separated in the form of an iron salt of carbonyl cobaltate from the oxo reaction product in a high yield. The qualities of the aldehydes and alcohols obtained in the oxo reaction will not be adversely influenced by this separation. The iron or iron compounds are commercially available and can be obtained with uniform qualities. Further, the iron salt of carbonyl cobaltate separated from the oxo reaction product is stable. The recovered cobalt carbonyl, which is obtained by decomposing the iron salt of carbonyl cobaltate with a mineral acid or organic acid, can be reused, as is, in the oxo reaction, without the necessity of complicated aftertreatments such as purification.

If the oxo reaction product used in the present invention has a relatively low solubility in water and it can be separated into two phases when mixed with water, it can be subjected, as is, to the extraction treatment according to the present invention. But, if the oxo reaction product is water-soluble, it should first be dissolved in water and then a sufficient amount of an organic solvent which is insoluble in water should be added to the resulting solution. The obtained mixture can be then subjected to the extraction treatment to extract cobalt carbonyl. By utilizing such means, the process of the present invention can be easily applied to any oxo reaction product comprising aldehydes, alcohols, carboxylic acid esters, acetals or mixtures thereof as main components. In the process of the present invention, cobalt carbonyl contained in the oxo reaction product is contacted with (a) an iron material selected from the group consisting of iron, oxides, hydroxides and weak acid salts of iron or (b) an aqueous solution of a mixture of a ferrous salt with an alkali metal or alkaline earth metal hydroxide, in the presence of water, carbon monoxide and hydrogen. The cobalt carbonyl is thereby converted to a water-soluble iron salt of carbonyl cobaltate. In order to assist an understanding of the reaction mechanism in the present invention, the basic paths in the extraction of dicobalt octacarbonyl with the above iron compound (a) are presumed to be as follows:

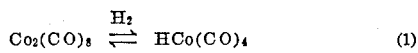

$$Co_2(CO)_8 \underset{}{\overset{H_2}{\rightleftharpoons}} HCo(CO)_4 \qquad (1)$$

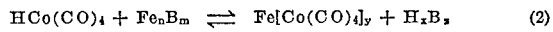

$$HCo(CO)_4 + Fe_nB_m \rightleftharpoons Fe[Co(CO)_4]_y + H_xB_z \qquad (2)$$

wherein $n$, $x$, and $y$ respectively represent a positive integer, B represents a base, $m$ and $z$ represent zero or a positive integer.

Further, the basic paths in the extraction of dicobalt octacarbonyl with the above aqueous solution of a ferrous salt mixture (b) are presumed to be as follows:

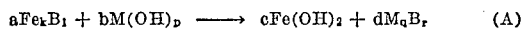

$$aFe_kB_l + bM(OH)_p \longrightarrow cFe(OH)_2 + dM_qB_r \qquad (A)$$

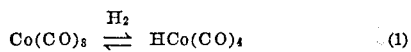

$$Co(CO)_8 \underset{}{\overset{H_2}{\rightleftharpoons}} HCo(CO)_4 \qquad (1)$$

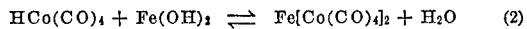

$$HCo(CO)_4 + Fe(OH)_2 \rightleftharpoons Fe[Co(CO)_4]_2 + H_2O \qquad (2)$$

wherein $a$, $b$, $c$, $d$, $k$, $l$, $p$, $q$, $r$ respectively represent a positive integer, B represents a base, M represents an alkali metal or alkaline earth metal ion.

Cobalt hydrocarbonyl in an aqueous solution acts as a Bronsted acid and its acidity corresponds to the acidity of nitric acid [Reppe et. al. Ann. 182 122 (1858)]. Further cobalt hydrocarbonyl which has been formed in the above Equation 1 reacts with an iron compound in such a manner as shown in the above Equation 2 or 2′ to give an iron salt of carbonyl cobaltate. The compounds participating in these equations are presumably in an equilibrium state. Accordingly, in order to produce a water-soluble iron salt of carbonyl cobaltate in a high yield by shifting the equilibrium to the right-hand side of the equation it will be necessary to select an appropriate iron material or iron-containing material.

As the appropriate form of iron to be used in the present invention, it is desirable, with respect to the iron material in group (a) mentioned above, to choose compounds having a combined base that has a weak basicity or is removable out of the reaction system. For example, irons such as wrought iron, Raney iron, reduced iron and undeveloped Raney iron; iron oxides; iron hydroxides; iron salts of weak acids such as iron carbonates, iron bicarbonates, iron sulfides, iron naphthenates, iron lactates and iron acetyl acetonates are preferred for this purpose. These are usually used singly, but a mixture of two or more kinds of these iron materials can be used.

With respect to the ferrous salt-alkali metal or alkaline earth metal hydroxide mixture (b) mentioned above, a ferrous salt of a mineral acid or an organic acid having strong acidity should be used as the ferrous salt. As such ferrous salt, there can be used ferrous chloride, ferous bromide, ferrous sulfate, ferrous phosphate, ferrous salts of fatty acids having 1 to 4 carbon atoms, ferrous benzenesulfonate, ferrous toluene-sulfonate, etc. These are usually used singly, but a mixture of two or more of these ferrous salts can be used. Further as the alkali metal or alkaline earth metal hydroxides, there can be used lithium hydroxide, sodium hydroxide, potassium hydroxide, calcium hydroxide, magnesium hydroxide, etc. The ferrous salt and the alkali metal or alkaline earth metal hydroxide should be combined so as to effect a double decomposition reaction to provide ferrous hydroxide. Selection of suitable combinations can be easily made according to the strength of acids and bases already known in the art. Since ferrous hydroxide will be easily oxidized in air and ferric ions produced by such oxidation may have an oxidizing action on cobalt hydrocarbonyl during the procedure of producing cobalt hydrocarbonyl from the ferrous salt of carbonyl cobaltate and during the circulating of same, the mixing of the ferrous salt and the alkali metal or alkaline earth metal hydroxide should be conducted immediately before use and in an atmosphere excluding air or oxygen. A convenient means for conducting such mixing, when the ferrous salt and the alkali metal or alkaline earth metal hydroxide are both water-soluble, is a liquid-liquid contact system, in which the respective aqueous solutions are contacted with each other to prepare ferrous hydroxide within an extractor. Further, in case either one of those compounds is sparingly soluble in water, ferrous hydroxide can be prepared in a liquid-solid contact system by means of a packed column. Usually, the mixing should be conducted so as to produce a ferrous hydroxide solution which is substantially neutral. For this purpose, in case the strength of the acids and bases is substantially equal between the ferrous salt and the alkali metal or alkaline earth metal hydroxide, both of these compounds should be mixed in equivalent amounts. However, because alkalinity may cause a condensation of the oxo reaction product, a slight excess of the ferrous salt is permitted.

The amount of the aforesaid iron, oxides, hydroxides and weak acid salts of iron as well as the amount of ferrous hydroxide to be produced in the above ferrous salt mixture (b) should be at least equal to the equivalent weight thereof to cobalt in the oxo reaction product. Especially it is preferable to use an equivalent amount or a slight excess of the (a) or (b) materials. But even if there is a substantial excess of the aforesaid (a) or (b) materials, there will be no problem during extraction. A by-reaction expected in an alkaline system, such as a condensation of aldehydes contained in the oxo reaction product, is substantially not observed, so that the quality of the oxo reaction product will not be damaged.

The method for effecting the contact of the oxo reaction product with water, carbon monoxide and hydrogen, and an iron compound (a) or a ferrous salt mixture (b) according to the present invention, should be selected for enabling a sufficient contact of the aforesaid materials depending on the form of said iron compound (a) or the mixed solution of a ferrous salt and an alkali metal or alkaline earth metal hydroxide (b). With respect to said mixed solution, the produced ferrous hydroxide will usually be a dispersion or a colloidal suspension, because it is insoluble in water or in an oxo reaction product. A liquid-liquid contact system can be employed when the iron material is soluble in water or in the oxo reaction product. An iron material which is insoluble in water or in the oxo reaction product, can be employed in the form of a dispersion or in a powder, solid or molded product form and a liquid-solid contact system may be employed. In a system for effecting the contact of an iron material in powder, solid or molded product form, it is desirable to use a packed tower through which water and an oxo reaction liquid should be passed concurrently or counter-currently.

The optimum amount of water to be used depends on the type of iron material used and the kind of apparatus used, but it is normally preferable to use 10 to 500 percent by volume of water based on the oxo reaction product.

The extraction of cobalt is conducted by maintaining a pressure of 10 to 500 kg./cm.$^2$, preferably 50 to 300 kg./cm.$^2$, with a mixed gas of carbon monoxide and hydrogen at a volume ratio in the range of 1/1 to 1/2 and at a temperature between 60 and 200° C., preferably between 100 and 170° C. The iron salt of carbonyl cobaltate extracted into the water phase is separated from the oxo reaction product. If necessary, a small amount of the iron salt of carbonyl cobaltate which remains in the oxo reaction product is washed with water so that it passes into the water phase. Further, in case the desired recovery of said salt is not attained by the first extraction operation, it is possible to repeat said extraction operation with the use of additional iron-containing materials (a) or (b). When the water phase is separated from the oxo reaction product in the above manner there exists only a trace amount of cobalt carbonyl in the oxo reaction product. Therefore, the alcohols and aldehydes produced by the oxo reaction can be separated from said oxo reaction product and purified by conventional procedures. The material of the apparatus to be used for the above extraction operation should be preferably a material having not only a sufficient alkali resistance but also resistance to corrosion by water gas. Stainless steel is suitable The alkalinity of said iron-containing materials (a) or (b) to be used in the process of the present invention is sufficient for preparing an iron salt of carbonyl cobaltate by a reaction with cobalt carbonyl, but it is not so strong that it will cause a condensation of aldehydes. Therefore, there will not be observed any change of the aldehydes under the conditions of the extraction treatment mentioned above. It is desirable to cause the time of treatment to be as short as possible, provided that the desired amount of the iron salt of carbonyl cobaltate is obtained, in view of the treating capacity. However, because, as described above, no change of aldehyde is observed during the treatment, there is no problem of obtaining a stable operation even if the oxo reaction liquid is contacted for more than the minimum required period of time. The oxo reaction liquid contacts the water and the iron-containing material (a) or (b), the resulting mixture is allowed to stand, then the water phase containing iron salt of carbonyl cobaltate is separated from the oxo reaction product.

Then, to the water phase containing iron salt of carbonyl cobaltate is added a mineral acid or an organic acid to decompose the iron salt of carbonyl cobaltate to cobalt carbonyl. Thereafter, cobalt carbonyl is separated from the water phase by using either one or a combination of an organic solvent, the starting olefinic compound and an inert gas. The cobalt carbonyl will then be recycled for the oxo reaction. As the mineral acids to be used for the decomposition of iron salts of carbonyl cobaltate, sulfuric acid, hydrochloric acid and phosphoric acid are suitable and, as the organic acids, organic acids having pKa of less than 2.5 such as trichloroacetic acid and p-toluene sulfonic acid are suitable. Iron salts of carbonyl cobaltate are mostly decomposed by the aforesaid acids into a volatile cobalt hydrocarbonyl. Cobalt hydrocarbonyl can be carried out of the system by means of a gas according to a known method, for instance, by blowing a gas such as nitrogen, carbon monoxide, hydrogen or carbon dioxide into the decomposed solution. The gas containing the cobalt hydrocarbonyl then passes in contact with a solvent for the oxo reaction or a starting olefin or a mixture thereof to absorb cobalt hydrocarbonyl. Alternatively, cobalt hydrocarbonyl can be extracted by a liquid-liquid extraction with a solvent for the oxo reaction or a starting olefin. In a further alternate procedure cobalt hydrocarbonyl can first be converted to a compound soluble in an organic solvent, such as dicobalt octacarbonyl, which can be extracted by the aforesaid liquid-liquid extraction.

Cobalt carbonyl and iron salts of carbonyl cobaltate, which are recovered and circulated in the process of the present invention, are generally sensitive to oxygen or oxidizing agents, etc., and, therefore, it is necessary to prevent them from contamination with oxygen or oxidizing agents, etc. in order to increase the recovery of cobalt carbonyl to a high level. This can be carried out by means of degassing or replacement of the atmosphere with an inert gas.

The present invention will be further explained with reference to various illustrative examples hereinafter, but the scope of the present invention is not limited to these examples.

EXAMPLE 1

Into a stainless steel autoclave provided with a magnetic stirring device were introduced 0.948 g. of dicobalt octacarbonyl, 19.8 g. of propylene, and 110 ml. of toluene, the atmosphere within the autoclave was substituted by hydrogen, and a gas mixture of equal volumes of hydrogen and carbon monoxide was charged to the autoclave so as to make the pressure 160 kg./cm.$^2$ gauge.

The contents were heated with stirring and when the temperature within the autoclave reached 120° C., generation of heat and a drop of the pressure occurred simultaneously therein. Then, the contents were maintained with stirring at 130° C. for an hour, then cooled to room temperature, and a part of the liquid phase produced therein was removed as a sample, which was subjected to gas chromatography analysis. In this analysis, benzene was added as an internal standard material and the analysis of the product showed that 30 g. of butyraldehydes were produced, in which the ratio of n-butyraldehyde to i-butyraldehyde was 78:22. Further, the total of high boiling substances, such as butanol and 2-ethylhexanal etc., was less than 2 percent by weight of butyraldehydes. The reaction mixture was transferred into a stainless steel autoclave provided with a magnetic stirring device and having a volume of 300 ml., in which 375 mg. of iron (III) hydroxide and 40 ml. of water were previously introduced. The atmosphere within the autoclave was substituted with hydrogen. A mixture of equal volumes of hydrogen and carbon monoxide was charged into the autoclave and the resulting mixture was heated at a temperature of 160° C. inside the autoclave for 30 minutes, under vigorous stirring. The gauge pressure during the reaction was 160 kg./cm.$^2$. After the reaction, the autoclave was cooled, gas was exhausted out of it, and the reaction mixture in the autoclave was allowed to stand to separate into two phases and then the upper toluene solution layer was taken out. 30 g. of butyraldehyde and 15.7 mg. of cobalt were contained in said toluene solution.

This toluene solution was again treated with iron (III) hydroxide and water under the same conditions as described above and the content of cobalt decreased to 2.2 mg. by this treatment. The chromatogram of the toluene layer did not have any substantial difference from the chromatogram of the oxo reaction product before the extraction treatment. 318 mg. of cobalt in the form of iron salt of carbonyl cobaltate was contained in the aqueous solution within the autoclave. To this aqueous solution were added 25.2 ml. of 0.267 N hydrochloric acid and cobalt hydrocarbonyl was driven out by blowing carbon monoxide gas into the mixture at a flow rate of 53. l./hr. for 2.5 hours, which decreased the content of cobalt in the aqueous solution to 9 mg. The cobalt hydrocarbonyl driven out of the autoclave was absorbed into toluene and it was reused as a catalyst for the oxo reaction. The reaction started at 120° C. and butyraldehydes were produced at substantially the same yield.

EXAMPLE 2

An oxo reaction product prepared by the substantially same reaction as in Example 1 was transferred into a stainless steel autoclave having a volume of 300 ml. and provided with a magnetic stirring device, into which 300 mg. of iron (II) hydroxide and 60 ml. of water were previously charged and the atmosphere within the autoclave was substituted by hydrogen. A mixture of equal volume of hydrogen and carbon monoxide was introduced into the autoclave and the resulting mixture was reacted under vigorous stirring at a temperature of 130° C. and a pressure of 170 kg./cm.² After the reaction, the autoclave was cooled and allowed to stand, thereby separating the resulting reaction mixture into two phases. The aqueous lower layer was transferred into an autoclave made of Hastelloy C having a 300 ml. volume and provided with a magnetic stirring device, into which 75 ml. of toluene and 25.2 ml. of 0.267 N hydrochloric acid had been previously introduced and the atmosphere had been substituted by carbon monoxide. Carbon monoxide was charged thereinto at 120° C. so as to make the gauge pressure 150 kg./cm.² and the extraction was conducted with vigorous stirring at 120° C. for an hour. After the extraction, the autoclave was cooled and allowed to stand, and the resulting mixture separated into two phases. The toluene solution of the upper layer contained 270 mg. of cobalt in the form of cobalt carbonyl. When this toluene solution was reused to provide the reaction catalyst as well as the solvent for the oxo reaction of propylene, butyraldehyde was produced in a high yield by a reaction at 120° C. as in Example 1.

EXAMPLE 3

Following the same procedure as in Example 1, except that the extraction was carried out only once, the extraction of cobalt carbonyl from an oxo reaction product of propylene was conducted by employing various kinds of iron materials. The results are shown in the following table in comparison with other metal compounds.

The numerical values in the column entitled "Extraction" of the following table refer to the values of the cobalt existing in the form of metal salt of carbonyl cobaltate or cobalt carbonyl. The values were calculated by the ratio of cobalt: carbon monoxide=1:4 based on the quantity of carbon monoxide determined by a carbonyl decomposing method according to iodometry (Oka et al., Analytical Chemistry 2 322 1953). When a high value is shown in the column entitled "Ratio of Not Extracted," there is a possibility of extracting same by a subsequent second extraction. The iron salts of carbonyl cobaltate extracted were converted to cobalt carbonyl through the same procedure as in Example 1 and were used as a catalyst for the hydroformylation of propylene, in which substantially the same results as in Example 1 was obtained.

iron salt, and carbon monoxide gas at one atmosphere pressure (absolute) was blown into the mixture at a flow rate of 100 l./hr. for 30 minutes to drive out cobalt hydrocarbonyl. By this treatment the content of cobalt in the solution was decreased to 3.6 percent. When the same treatment as above was carried out by the addition of trichloroacetic acid, the cobalt content was decreased to 35 percent. When said driven out cobalt hydrocarbonyl was absorbed in toluene and it was reused as a catalyst for an oxo reaction of propylene, the reaction started at 120° C. and substantially the same yield of butyraldehyde was obtained.

EXAMPLE 5

A stainless steel autoclave of a volume of 500 ml., provided with a magnetic stirrer, was charged with 0.948 g. of dicobalt-octacarbonyl, 1.98 g. of propylene and 110 ml. of toluene. After the atmosphere of the autoclave had been substituted with hydrogen, a mixture of equal volumes of hydrogen and carbon monoxide was added to elevate the pressure up to 160 kg./cm.² The resulting mixture was heated with agitation. When the temperature in the autoclave reached 120° C., heat generation and a pressure drop occurred. Then, the mixture was maintained at 130° C. with agitation for one hour and cooled to room temperature. A solution of 422 mg. of ferrous chloride dissolved in 35 ml. of water and a solution of 243 mg. of sodium hydroxide dissolved in 35 ml. of water were introduced into said autoclave by two high pressure liquid feed pumps, of which respective discharge pipes were connected together so as to mix sufficiently these two solutions in equal volumes. The contents of the autoclave, after being heated to 160° C. with agitation and maintained at this temperature for 30 minutes, were cooled and left to stand to separate the reaction mixture into two phases. The obtained upper toluene phase contained 30 g. of butyraldehydes and 32 mg. of cobalt, but substantially no aldol condensates of n-butyraldehyde by alkali were present.

On the other hand, the lower aqueous phase contained 810 mg. of cobalt in the form of the iron salt of cobalt carbonyl. This aqueous phase was transferred in a 300 ml. autoclave of Hastelloy C which was equipped with a magnetic agitator, to which had been previously introduced 75 mg. of toluene and 25.2 ml. of 0.267 N HCl solution, and the contents were treated with carbon monoxide substitution. After the autoclave was filled with carbon monoxide to a gauge pressure of 150 kg./cm.²

TABLE.—EXTRACTING REAGENTS AND EXTRACTION YIELDS

| | | Reaction conditions | | | Extraction | |
|---|---|---|---|---|---|---|
| Number | Kinds of extracting reagent | Temperature (° C.) | Pressure (kg./cm.²) | Equivalent weight ratio of metal ion to cobalt | Time (hr.) | Extraction yield, percent | Ratio of not extracted, percent |
| 1 | Iron (II) hydroxide | 130 | 170 | 1.2 | 1.0 | 97.0 | 1.0 |
| 2 | do | 160 | 160 | 1.2 | 0.5 | 96.5 | 1.0 |
| 3 | Iron (III) hydroxide | 130 | 180 | 1.2 | 1.0 | 97.0 | 1.2 |
| 4 | Iron oxide | 160 | 160 | 2.0 | 0.5 | 97.1 | 0.5 |
| 5 | Raney-iron | 160 | 160 | 2.0 | 0.5 | 86.7 | 12.6 |
| 6 | Colloidal iron (III) hydroxide | 160 | 160 | 1.3 | 0.5 | 91.1 | 9.5 |
| 7 | Iron (II) naphthenate | 160 | 160 | 1.2 | 0.5 | 85.3 | 11.3 |
| 8 | Iron (II) lactate | 160 | 160 | 1.3 | 9.5 | 83.6 | 12.8 |
| 9 | Iron (II) acetylacetonate | 160 | 160 | 1.6 | 0.5 | 84.7 | 3.9 |
| 10 | do | 160 | 160 | 1.3 | 0.5 | 81.8 | 11.6 |
| 11 | Sodium carbonate | 160 | 160 | 1.2 | 0.5 | 83.1 | 7.6 |
| 12 | Silver carbonate | 160 | 160 | 1.2 | 0.5 | 50.7 | 8.3 |
| 13 | Zinc oxide | 160 | 160 | 1.3 | 0.5 | 71.5 | 2.5 |
| 14 | Aluminum hydroxide | 160 | 160 | 1.2 | 0.5 | 45.2 | 21.6 |
| 15 | Titanium (IV) oxide | 160 | 160 | 1.2 | 0.5 | 59.6 | 7.1 |
| 16 | Tin (IV) oxide | 160 | 160 | 3.4 | 0.5 | 49.5 | 10.4 |
| 17 | Manganese carbonate | 160 | 160 | 1.2 | 0.5 | 74.5 | 0.5 |
| 18 | Nickel oxide | 160 | 160 | 1.2 | 0.5 | 57.4 | 7.9 |

NOTE.—Nos. 1 to 10 represent examples according to the present invention. Nos. 11 to 18 represent control examples for comparison.

EXAMPLE 4

To 15 ml. of an aqueous solution of iron salt of carbonyl cobaltate produced in Example 3 in No. 1 of the above table, was added 1.2 equivalents of p-toluene sulfonic acid based on the iron of the above at 120° C., the extraction was carried out at 120° C. with vigorous agitation for one hour. After the completion of reaction, the contents of the autoclave were left to stand to separate the contents into two liquid phases.

The upper toluene phase contained 294 mg. of cobalt in the form of cobalt carbonyl. When this toluene solution was directly employed as a catalyst solution for the oxo-reaction of propylene, the reaction started at 120° C. to produce butyraldehyde with a high yield.

EXAMPLE 6

In the same manner as Example 5, the oxo-reaction mixture of propylene as obtained by the reaction similar to that of Example 5 was charged in the autoclave together with a solution of 505 mg. of ferrous sulphate dissolved in 35 ml. of water and a solution of 179 mg. of potassium hydroxide dissolved in 35 ml. of water, was heated to 130° C. with agitation, and maintained at this temperature for one hour. The autoclave was left to stand after cooling to separate the reaction mixture into two phases. The upper toluene solution contained 30 g. of butyraldehyde and 12 mg. of cobalt. The lower aqueous solution was transferred to a 300 ml. autoclave of Hastelloy C which was equipped with a magnetic agitator to which was added 25.2 ml. of 0.267 N hydrochloric acid. The atmosphere was replaced with carbon monoxide. Then carbon monoxide was blown in at the rate of 53 l./hr. for 2½ hours to drive out cobalt carbonyl, which was absorbed in toluene. The obtained toluene solution was again employed as the catalyst for the oxo-reaction of propylene and was found to provide substantially the same reaction results as those of Example 1.

The embodiments of the invention in which an exclusive property or privilege is claimed are defined as follows:

1. A process for recovering cobalt present as catalyst in an oxo reaction product, which comprises contacting said oxo reaction product with a member selected from the group consisting of
   (a) an iron material selected from the group consisting of iron, and oxides, hydroxides and weak acid salts of iron, and mixtures thereof, and
   (b) an iron-containing mixture prepared by mixing an aqueous solution of at least one ferrous salt of a strong acid with an aqueous solution of an alkali metal hydroxide or an alkaline earth metal hydroxide in which a double decomposition has been caused so as to produce ferrous hydroxide in said mixture, in the presence of water, carbon monoxide and hydrogen at a pressure of 10 to 500 kg./cm.$^2$ and at a temperature of 60 to 200° C., the volume ratio of carbon monoxide and hydrogen being in the range of 1/1 to 1/2, to extract cobalt present in said oxo reaction product to the aqueous phase by converting it to a water-soluble iron salt of carbonyl cobaltate, separating said aqueous phase from said oxo reaction product, then decomposing said water-soluble iron salt of carbonyl cobaltate with a mineral acid or organic acid to convert it to cobalt carbonyl.

2. The process as claimed in claim 1, in which said iron material is selected from the group consisting of wrought iron, Raney iron, reduced iron, undeveloped Raney iron, iron oxides, iron hydroxides, iron carbonates, iron bicarbonates, iron sulfides, iron naphthenates, iron lactates and iron acetyl acetonates.

3. The process as claimed in claim 1, in which the amount of (a) or (b) employed in the contacting step is at least equal to the equivalent amount thereof to the cobalt in the oxo reaction product.

4. The process as claimed in claim 1, in which the amount of water employed in the contacting step is in the range of 10 to 500 percent by volume based on the oxo reaction product.

5. The process as claimed in claim 1, in which said pressure is in the range of 50 to 300 kg./cm.$^2$ and said temperature is in the range of 100 to 170° C.

6. The process as claimed in claim 1, in which said mineral acid is selected from sulfuric acid, hydrochloric acid and phosphoric acid.

7. The process as claimed in claim 1, in which said organic acid is selected from trichloroacetic acid and p-toluene sulfonic acid.

References Cited

UNITED STATES PATENTS

| | | | |
|---|---|---|---|
| 3,196,171 | 7/1965 | Gunter et al. | 423—139 X |
| 3,298,779 | 1/1967 | Goto et al. | 423—139 |
| 2,992,275 | 7/1961 | Niwa et al. | 423—594 |
| 3,188,351 | 6/1965 | Lemke | 260—604 HF |

HERBERT T. CARTER, Primary Examiner

U.S. Cl. X.R.

423—138, 417, 418; 260—604